(No Model.)
W. B. DOUGLAS.
BALL BEARING.
No. 492,958. Patented Mar. 7, 1893.
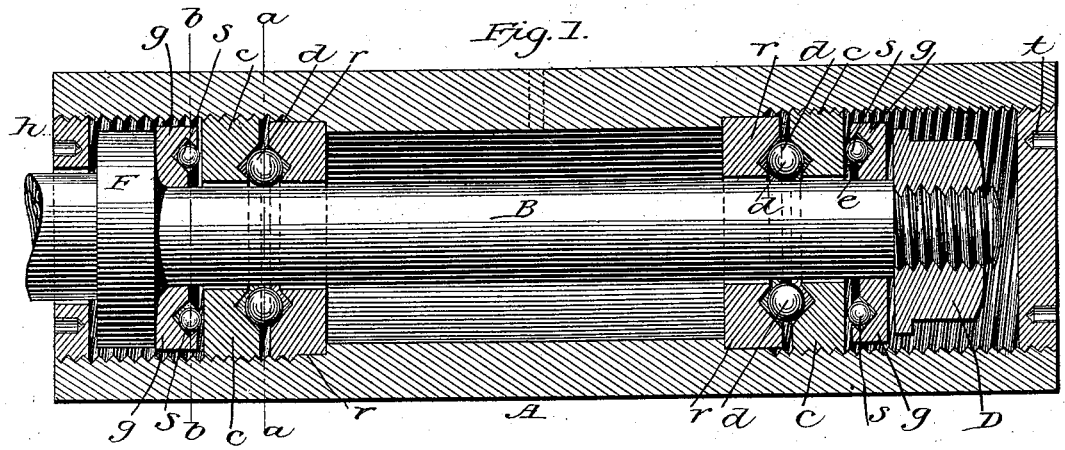
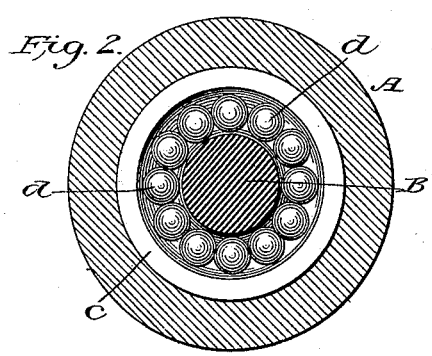
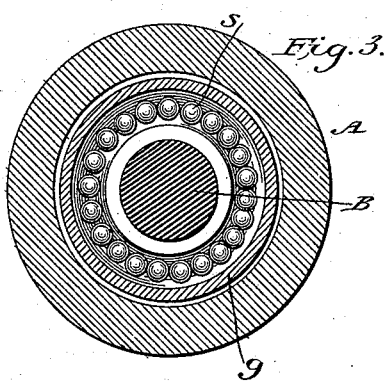
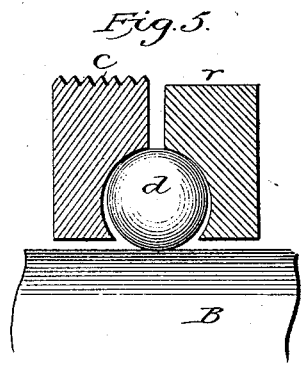
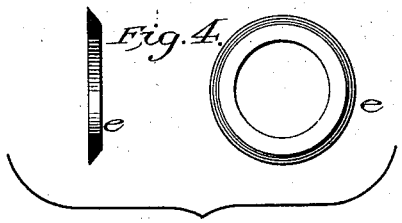
Witnesses.
Charles Hannigan
James E Arnold
Inventor.
William B Douglas
By Berry Arnold Atty

UNITED STATES PATENT OFFICE.

WILLIAM B. DOUGLAS, OF PHENIX, RHODE ISLAND.

BALL-BEARING.

SPECIFICATION forming part of Letters Patent No. 492,958, dated March 7, 1893.

Application filed April 20, 1892. Serial No. 429,973. (No model.)

*To all whom it may concern:*

Be it known that I, WILLIAM B. DOUGLAS, of Phenix, in the county of Kent and State of Rhode Island, have invented certain new and useful Improvements in Ball-Bearings; and I do hereby declare that the following is a full, clear, and exact description thereof, reference being had to the accompanying drawings, and to the letters of reference marked thereon, which form a part of this specification.

This invention relates to that class of antifrictional bearings, known as "ball bearings," and has for its object, to provide means for retaining the balls in place when the box or hub is removed from the shaft or axle, and also for the ready adjustment of the parts at any time to take up any play or looseness between them, and produce a steady running motion of the shaft or wheels connected with it. It is fully illustrated in the accompanying drawings.

Figure 1 shows a vertical section lengthwise of the hub or box, and also of the rings that hold the balls, with the axle and balls in elevation. Fig. 2 is a vertical cross-section taken on line $a$, $a$, in Fig. 1, showing the box and axle in section, with the balls and rings in elevation. Fig. 3 is a vertical cross-section taken on line $b$, $b$, Fig. 1, showing the box, axle and outer part of the ring in section, with the balls and inner part of the ring in elevation. Fig. 4 shows a plane view, and also a section of one of the washers. Fig. 5 is an enlarged view of one of the larger balls and parts of the rings that hold them, to show the arrangement for adjustment.

It is shown and described in this specification, as applied to a wheel and axle; but is adapted for use wherever there is a pulley or shaft, running on a shaft or in a bearing.

A, represents a box or hub, and B, the axle on which it turns. The shell of the hub A, is bored out larger at each end than the middle portion, and shoulders left between one-fourth and one-third of the length in from the ends, for the inner rings $r$, $r$, to rest against. A screw-thread is made on the inside of the shell from each ring $r$, out to the end. Two more rings $c$, $c$, are made like the rings $r$, $r$, excepting that they are a little larger in diameter, and have screw-threads cut on their peripheries that fit into the threads in the hub A. Each of the four rings $r$, $c$, have similar grooves made in one of their faces nearest to the inner sides of the rings, so as to cut into the hole in the ring, as seen in Fig. 5, and have a portion of the face of the ring on the outside of the groove, intact. By putting the grooved faces of two rings together, a chamber is made to hold the balls $d$. The grooves in the rings $r$, $c$, being cut through on the inner side of the rings, brings the balls $d$, in, so as to rest on the axle B, while the outer sides of the balls rest on the other sides of the grooves. The object of the screw-thread on the rings $c$, is that by turning them they can be brought nearer to the rings $r$, and the balls $d$, pressed in toward the axle to adjust them so as to take up any looseness, and prevent rattling. The inner corners of the grooves being cut away as described, they do not prevent the ball from approaching the axle; but at the same time are near enough to each other to keep the balls from passing out of the groove when the axle is removed.

Two inner rings $g$, $g$, are made to slide freely in through the threaded parts of the shell A, and the holes in them, as in the case of rings $r$ and $c$, are made a little larger than the axle. These rings $g$, have grooves cut in the center of one of their plane faces, which grooves are under cut on their sides to hold the balls $s$, $s$, in; but for the purpose of putting the balls into the groove, the overhanging portion on the inner side of the groove is made removable in the shape of a washer $e$, (see Fig. 4.) The balls are placed in the groove, and then the washer $e$, is put in and made fast to the ring $g$. A collar F, is made to fit easily on the axle at the inner end of the bearing, against which one of the rings $g$, with balls $s$, rests, and the back of the first ring $c$, rests against the balls $s$, to receive the end thrust of the wheel, in that direction. At the outer end of the hub, the other ring $g$, with balls $s$, is placed, so that the balls rest against the back of the second ring $c$, to take the pressure of the end thrust in the outer direction. A nut D, is fitted to screw on a screw-thread on the end of the axle, to hold the whole in place. The inner end of the hub A, extends in over the collar F, far enough to receive the collar $h$, which is made with a screw-thread to screw into the hub to close the end and exclude the dust and wet from the inside. A washer $t$, is in like manner and for the same purpose, screwed into the outer end of the hub.

When the hub, as shown in Fig. 1, is to be removed from the axle, the washer $t$, is first unscrewed, and the nut D, turned off, then the hub with all the rings and collar F, can be drawn off the axle, and handled without displacing the balls in any way, and the whole can easily be slid onto the axle again, and the nut and outer collar screwed to place.

It will be seen that there is no rubbing friction in the running parts, as the large balls $d$, take all the vertical pressure, and the smaller balls $s$, receive any endwise pressure that there may be.

Having thus described my improved ball bearing, I claim as my invention—

1. In a ball bearing, a shell having a screw-thread made in each end, in combination with two independent pairs of rings having grooves made in their contiguous faces, and the outer ring of each pair having a screwthread made to fit into the screwthread made in the end of the shell, and a series of balls in said grooves having rolling contact with the shaft substantially as set forth.

2. A shell for ball bearings having a central chamber around the shaft, in combination with a ring permanently located at each end of said chamber and having grooves in their outer surfaces, a ring placed outside of each of the first-mentioned rings, and having screw-threads made on their outer surfaces fitting into threads made in the ends of the shell and grooves made in the inner surfaces, of said outside rings, and a series of balls substantially as described.

3. A ball-bearing comprising a shell having a central chamber around the shaft, a ring permanently located at each end of said chamber and having grooves in their outer surfaces, a ring placed outside of each of the first mentioned rings and having screw-threads made on their outer surfaces fitting into threads made in the ends of the shell and grooves made in the inner surfaces of the outside rings, a loose ring outside of each pair of said rings, each loose ring having a groove in its inner face, said grooves being undercut on one side, a beveled washer fitted in a recess in each ring to form the overhanging edge of the groove, and balls in said grooves, substantially as set forth.

WILLIAM B. DOUGLAS.

Witnesses:
BENJ. ARNOLD,
JAMES E. ARNOLD.